United States Patent [19]

Trizna

[11] Patent Number: 4,633,255

[45] Date of Patent: Dec. 30, 1986

[54] METHOD FOR SEA SURFACE HIGH FREQUENCY RADAR CROSS-SECTION ESTIMATION USING DOPLER SPECTRAL PROPERTIES

[75] Inventor: Dennis B. Trizna, Burke, Va.

[73] Assignee: The United States of America as represented by the Secretary of the Navy, Washington, D.C.

[21] Appl. No.: 495,215

[22] Filed: May 16, 1983

[51] Int. Cl.$^4$ .............................................. G01S 13/50
[52] U.S. Cl. ..................................... 342/192; 342/26
[58] Field of Search ................. 343/5 CE, 5 SA, 5 W, 343/5 CM, 5 FT, 5 NQ

[56] References Cited

U.S. PATENT DOCUMENTS

| | | | |
|---|---|---|---|
| 3,344,419 | 9/1967 | Lund | 343/5 SA |
| 3,806,929 | 4/1979 | Moore | 343/5 R |
| 3,842,418 | 10/1974 | Lorber | 343/5 SA |
| 4,053,886 | 10/1977 | Wright et al. | 343/5 SA |
| 4,054,879 | 10/1977 | Wright et al. | 343/5 SA |
| 4,101,890 | 7/1978 | Goyard | 343/8 |
| 4,101,891 | 7/1978 | Jain et al. | 343/17.2 PC |
| 4,148,027 | 4/1979 | Nowogrodzki | 343/5 SA |
| 4,151,527 | 4/1979 | Masliah et al. | 343/7.5 |
| 4,172,255 | 10/1979 | Barrick et al. | 343/5 W |
| 4,185,285 | 1/1980 | Bosc | 343/5 SA |
| 4,241,350 | 12/1980 | Uffelman | 343/5 SA |
| 4,348,674 | 9/1982 | Muth et al. | 343/5 SA |

FOREIGN PATENT DOCUMENTS 2480945 10/1981 France .................. 343/5 W

OTHER PUBLICATIONS

Grantham et al; "The Seasat-A Satellite Scatterometer", 9/76 (Oceans '76 Conf.), pp. 1-4.
D. B. Trizna; "Estimation of the Sea-Surface Radar Cross-Section at HF from Second-Order Doppler Spectrum Characteristics", 5/25/82; NRL Report 8579, p. 19.
Dennis B. Trizna et al., "Directional Sea Spectrum Determination Using HF Doppler Radar Techniques", IEEE Transactions on Antennas and Propagation; vol. AP 25, No. 1, Jan. 1977, pp. 4–11.
Donald E. Barrick et al., "Sea Backscatter at HF: Interpretation and Utilization of the Echo"; Proceedings of the IEEE; vol. 62, No. 6, Jun. 1974, pp. 673-680.
"Microwave Scattering from the Ocean Surface", by W. Jones et al; IEEE Trans. on Microwave Theory and Techniques/, (12/75), pp. 1053-1058.

Primary Examiner—Thomas H. Tarcza
Assistant Examiner—Bernarr Earl Gregory
Attorney, Agent, or Firm—Sol Sheinbein; John L. Forrest

[57] ABSTRACT

A method for estimating the high frequency radar cross-section of the sea surface. A Doppler spectrum of the sea surface is obtained by correlating returns from high frequency radar signals. Approach and recede Bragg spectral lines and a zero Doppler frequency continuum level are identified in the Doppler spectrum. The amplitude ratio $\rho$ between the Bragg spectral lines and an amplitude ratio $\zeta_M$ between the maximum amplitude Bragg spectral line and the zero Doppler frequency continuum are measured from the Doppler spectrum. The radar cross-section is then determined from the ratios $\rho$ and $\zeta_M$. In a further method embodiment, the estimated radar cross-section is used to estimate the radar cross-sections of targets appearing in the Doppler spectrum.

13 Claims, 7 Drawing Figures

METHOD FOR SEA SURFACE HIGH FREQUENCY RADAR CROSS-SECTION ESTIMATION USING DOPLER SPECTRAL PROPERTIES

BACKGROUND OF THE INVENTION

The present invention relates, in general, to a high frequency (HF) radar method for estimating the radar cross-section of the sea surface and, more particularly, to a method for estimating the HF radar cross-section of ships and aircraft using Doppler spectral properties.

The doppler spectrum of HF (high frequency) radar backscatter from the sea is of particular interest because of its demonstrated potential as a comprehensive remote source of sea surface conditions over large areas of the earth's ocean surface. Operating in a band of frequencies roughly 3-30 MHz, HF radar energy is reflected from the ionosphere back to earth covering ranges, nominally, from 1000 to 3500 km from the radar, with sufficient energy density to be useful for remote sensing. A fraction of this energy is reflected from the sea surface back to the radar with phase and amplitude altered. With doppler processing of such data, information about the directional sea spectrum averaged over the radar cell can be inferred from characteristics in the processed radar power spectrum. Direction and magnitude of the winds exciting the sea surface within the scattering patch can then be inferred using inversion techniques based upon models of the sea spectrum.

The radar scattering coefficient of the sea surface at HF, $\sigma^\circ$, is generally difficult to obtain by a straight-forward well-calibrated radar measurement because several of the variables used in the radar equation are not well known. For either surface wave or skywave illumination of the sea surface, the gain to be used in the radar equation is difficult to estimate because it can be a complex function of local ground, soil moisture, ground screen quality, coupling to the sea surface, tidal effects, and so on. For the case of a skywave measurement the problem is further compounded by the variation of the gain with elevation angle, as well as the ionospheric propagation losses the signal suffers within the ionosphere in its two refractive passes.

Knowledge of the scattering coefficient $\sigma^\circ$ of the sea surface by a means independent of the radar equation would allow the unknown discussed above to be determined as well as prove useful for comparison with targets which might be detected in the Doppler spectrum being measured. From this information, attempts could be made to apply target identification techniques to the target of interest.

Several target identification techniques have been developed over the past several years and are particularly applicable to the HF band of radar frequencies. Some examples of these target identification techniques have been reported by H. C. Lin and A. A. Ksiensky, "Optimum Frequencies for Aircraft Classification", Ohio State University Electroscience Laboratory Technical Report 78 3815-6, 1979. These techniques depend upon a multi-parameter measurement of a target and a comparison of that measurement with a catalog of values of the radar cross-section as a function of the parameter available. The parameters in question typically include radar frequency, polarization and phase. For ionospheric propagation, radar frequency can be varied over a reasonable bandwidth for coverage of a given illuminated area, of the order of 3 to 6 MHz. For the elliptically polarized wave which exits the ionosphere, a measurement of the difference between the minima and maxima in signal amplitude can be used to draw some conclusions about the ratio of horizontal to vertical radar cross-section of a target. Phase information in an absolute or even relative sense between two radar frequencies is not known for ionospheric propagation. Hence, with some information about two of the three parameters available, target identification with skywave HF radar might be possible with a satisfactory calibration cross-section for comparision, such as that of the sea suface.

Another application of such cross-section information is that of remote sensing of the sea surface. It is well known that, to first order, the cross-section of the sea surface is proportional to the components of the ocean wave directional energy spectrum which are traveling toward and away from the radar bearing. Hence, assuming the directional spreading of the wave spectrum is known or can be estimated, a determination may be made as to how highly the sea surface is developed. Coupled with knowledge of the largest wavelengths excited and an estimate of wave spreading with angle, a good estimate of the root mean square wave height may be obtained.

Heretofore, there was no way to accurately estimate the sea surface scattering coefficient and as a result there was no way to estimate the radar cross-section of sea scatter, a related quantity. The radar cross-section has usually been assumed to be a constant value of $-29$ dbm$^2$. This assumes that the sea surface is fully developed and does not account for the directional properties of ocean waves. As a result of these assumptions, errors as high as 20 db or more can occur because of uncertainties in ionosphere losses and other propagation phenomena, so that target identification with HF radar has not been feasible using prior art methods.

SUMMARY OF THE INVENTION

Accordingly, an object of the present invention is to provide a method for estimating the high frequency radar cross-section of the sea surface.

Another object is to provide a method for estimating the high frequency radar cross-section of targets appearing in high frequency Doppler radar spectra.

These and other objects and advantages are provided by estimating the high frequency radar sea surface cross-section. According to the method, high frequency Doppler radar signals are scattered onto a sea surface and echo returns are received in response thereto. The echo returns are correlated over an integration time period to obtain a Doppler spectrum of the sea surface. Using the Doppler spectrum, approach and recede Bragg spectral lines and a zero Doppler frequency continuum level are identified. The amplitude difference between the approach and recede Bragg spectral lines is measured to determine an approach/recede amplitude ratio $\rho$. The approach and recede Bragg spectral lines in the Doppler spectrum are then compared to determine the Bragg spectral line having the maximum amplitude. The amplitude difference between the maximum amplitude Bragg spectral line and the zero Doppler frequency continuum level is measured to determine a measured Bragg line/continuum amplitude ratio $\zeta_m$. The sea surface radar cross-section is then determined from the measured approach/recede ratio $\rho$ and the measured Bragg line/continuum ratio $\zeta_m$.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
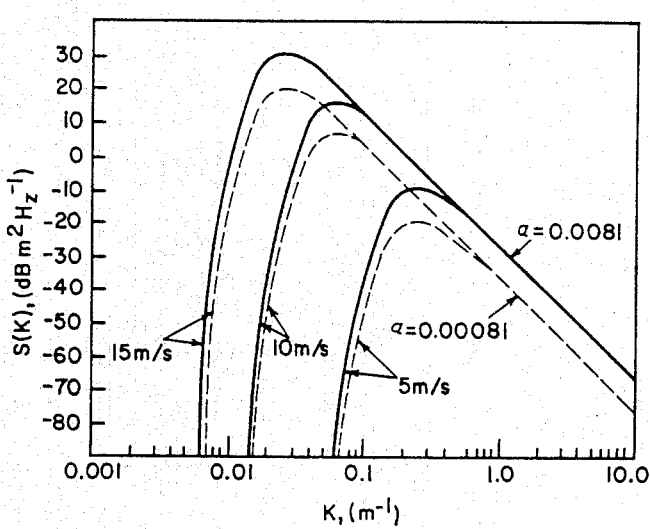
FIG. 1 is a plot of the ocean spectrum S(K) as a function of the wave number K for various values of wind speed generating the seas and for two values of a constant $\alpha$.

The integrated or total radar cross section measured by a Doppler radar is defined by the equation:

$$\sigma^o = \tfrac{1}{2} \int_{-\infty}^{\infty} \sigma^o(\omega)d\omega = \int_{0}^{\infty} \sigma^o(\omega)d\omega \qquad (1)$$

where $\omega$ is the frequency in radians. In operating a pulse-Doppler radar with a given receiver band pass filter, the integrand of Equation (1) is multiplied by the filter function describing the filter, which effectively changes the limits of integration to the upper and lower frequencies of the pass band. Since the radar is operated at some pulse repetition frequency, or PRF, the sampling theorem effectively folds the energy contained in the pass band filter into a narrower band of frequencies equal to that of the radar PRF, generally tens of hertz for an HF radar. The PRF is typicaly chosen so as to contain all of the scattered radar energy of interest in an unambiguous manner in Doppler. The result is that the limits of integration of Equation (1) can be further reduced to that of plus and minus one half of the PRF. The variable of integration is now Doppler frequency, $\omega_D$.

The term within the kernel of Equation (1) is referred to as the scattering cross-section per unit frequency, or scattering cross-section, as opposed to the total or integrated cross-section on the left hand side. For sea scatter at HF, it can be expanded into first, second, and higher order contributions in the following manner:

$$\sigma^o(\omega_D) = \sigma^o_{(1)}(\omega_D) + \sigma^o_{(2)}(\omega_D) + \ldots \qquad (2)$$

where the two terms on the right side are the first- and second-order contributions to the radar cross-section.

The relationship of the first-order approach-recede Bragg line contributions to the radar Doppler spectrum with the wind driven ocean wave spectrum is:

$$\sigma^o_{(1)}(\theta,\omega_D) = 8\pi K_B^4 [S(K_B,\theta)\delta(\omega_D+\omega_B) + S(K_B,\theta+\pi)\delta(-\omega_D-\omega_B)] \qquad (3)$$

where $S(K_B,\theta)$ is the directional ocean wave spectrum; $\theta$ is the angle between the transmitted radar vector and the wind direction; $K_B$ is the Bragg resonant ocean wave number, related to the radar wave number, k, by $K_B = 2k \sin\phi$; $\phi$ is the angle between the normal and incident (and scattered) radio wave; and $\omega_B = \Omega_B = \sqrt{gK_B}$ (g is the gravitational constant) is the Bragg Doppler frequency, equal to the ocean wave Bragg frequency.

The ocean wave directional power spectrum can be written as:

$$S(\vec{K}) = S(K,\theta) = S(K)F(\theta) \qquad (4)$$

where $F(\theta)$ is the spreading function and where the approximation has been made that the angular dependence of the spreading of ocean waves is independent of wave number. The first term is the so-called omnidirectional energy spectrum, since $F(\theta)$ integrated over all angles gives unity. A typical form for the omnidirectional spectrum is the Pierson-Moskowitz spectrum:

$$S(\Omega)d\Omega = \alpha g^2 \Omega^{-5} \exp[-b(g/\Omega\omega)^4]d\Omega \qquad (5a)$$

or, in terms of wave number:

$$S(K)dK = (\alpha/2)K^{-3} \exp[-b(g/K\omega^2)^2]dk \qquad (5b)$$

where $\omega$ is the wind speed at 19.4 feet above the sea surface; b is a constant, 0.74; $\Omega$ is the wave frequency in radians; and $\alpha$ is typically of the order of 0.0081 for long fetches, but which has been shown to be a function of fetch. The factor $\alpha$ is commonly known as the Phillips constant.

FIG. 1 is a plot of the ocean wave spectrum S(K) of Equation (5b) as a function of the wave number K for various values of wind speed generating the seas and for two values of the constant $\alpha$. Two families of curves representing ocean spectra are shown. Each family is parametric in the wind speed, with the low frequency amplitudes growing with the wind. The difference between the two families is the constant $\alpha$: the upper family being determined using a value $\alpha = 0.0081$ (solid lines), while the lower family is determined by $\alpha = 0.00081$ (broken lines). The asymtotes vary as a function of $K^{-3}$. It should be noted that the decibel difference between the asymtotes of each family of curves at high frequencies is 10 db as a result of the factor of ten difference in the constant $\alpha$.

Since the radar cross-section is determined essentially by the sum of the first-order contributions to the Doppler spectrum, and these terms are proportional to the amplitude of the ocean wave spectrum at the Bragg wavelength, the radar cross-section will vary linearly with the parameter $\alpha$:

$$\sigma^o(\theta,\omega_D) \approx 4\pi\alpha[F(\theta)\delta(\omega_D+\omega_B) + F(\theta+\pi)\delta(\omega_D-\omega_B)] \qquad (6)$$

In the above we have set the exponential factor of Equation (5b) to one, since it affects the spectrum near the low frequency falloff, but not near $K_B$ (5 to 15 meter ocean wavelengths).

When operating in a normal monostatic mode, if a very narrow beam radar operating line of sight or in the surface wave mode is steered, the maximum Bragg line of the approach-recede pair can be observed to reach it maximum amplitude in the direction that is parallel to the wind. The weaker of the two will likewise reach its minimum value at this bearing. The ratio of the two, $\rho$, will thereby reach its maximum value. At right angles to the wind direction, this decibel ratio goes to zero, as the maximum Bragg peak has decreased and the minimum has increased such that two are equal. This behavior with angle reflects the fact that the variations in $\rho$ are strictly due to the variation of the spreading function of Equation (4) with angle. Since the omnidirectional spectrum is the same over the area covered by the radar (very short ranges are assumed), the only variation in the left hand side of Equation (4) is due to $F(\theta)$.

This technique can be used to estimate the angle that the radar bearing makes with the wind driven waves for a single radar bearing. The technique has been implemented in the skywave mode of operation to derive wind direction fields over large expanses of the ocean and to locate hurricane centers and define fronts using very narrow beam antennas.

Although this technique allows the direction of the wind to be estimated, the problem of estimating the first factor of Equation (4) from first-order Bragg line measurements used with the radar equation alone remains difficult because of the antenna gain uncertainties. Additional information is available in the second order contribution, however, which can allow the amplitude of the parameter $\alpha$ to be estimated and, hence, can allow a similar estimation of $\sigma^\circ$.

The second-order contribution may be developed by applying the physical laws of conservation of momentum and conservation of energy to a simple corner reflector model of the sea surface. The corner reflector model is outlined by TRIZNA et al. "Directional Sea Spectrum Determination Using HF Doppler Radar Techniques", IEEE Transactions, AP, AP-25, pp. 4–11, 1977. This analysis produces the following equation which defines the second-order scattering energy within a given Doppler filter centered at frequency $W_D'$:

$$\sigma^\circ_{(2)}(\omega_D', \theta) = 2^6 \pi K^4 \delta d\vec{\omega}_D \delta d\vec{K}_1 |T|^2 S(\vec{K}_1) \quad (7)$$
$$S(\vec{K}_2) G(\omega_D - \omega_D') \delta(\omega_D \pm r_1 \pm r_2)$$

where $\omega_D'$ is the filter center frequency, $\Gamma$ is the transfer function, $\vec{K}_1$ is the wave number of the first ocean wave, $\vec{K}_2$ is the wave number of the second ocean wave, $\delta(\omega_D \pm \Omega_1 \pm \Omega_2)$ is the Dirac delta function, and $G(\omega_D - \omega_D')$ represents the spectral response of the FFT (fast fourier transform) filter, typically a sinc-function if no time weighting is done on the FFT.

Note that the first-order Bragg line energy is obtained in a similar manner, integrating Equation (6) over Doppler frequency with an appropriate Doppler filter shape. Note also that the first- and second-order contributions behave differently with different coherent integration times, or Doppler filter line widths. Because the first-order Bragg line is a coherent discrete spectral line return with fixed total energy, the response will increase relative to the noise level with narrowing Doppler filter width. However, the second-order term is a noise-like continuum, and as the Doppler filter is narrowed, a smaller spread in $dK_1$ and $dK_2$ is included for a given Doppler filter. This excluded energy appears in an adjoining Doppler filter, and as such, behaves as a noise spectrum rather than a coherent narrow spectral return. (As the coherent integration time is doubled in the FFT process and the special width of the FFT filter is halved, the number of spectral filters is doubled across the total Doppler bandwidth).

The determination of $\sigma^\circ$ according to the present invention depends upon two measurements, that of the ratio of approach/recede Bragg line amplitudes, $\rho$, and a measure of the amplitude ratio of the maximum Bragg line to zero Doppler continuum, $\zeta_M$, plus a consideration of the coherent integration time used in the processing. The first measurement allows the angle between the radar bearing and the wind/wave direction to be determined, and thereby allows a determination of $F(\theta)$ in Equation (4). The second measurement allows a determination of the Phillips' constant, $\alpha$, of Equation (5) using Equations (6) and (7) for zero Doppler frequency. With knowledge of $\alpha$ and $\theta$, the radar cross-section is thereby determined using these in Equation (6). A final correction is also made for the integration time, or Doppler filter width used, and is included in the final results.

Figure 2:
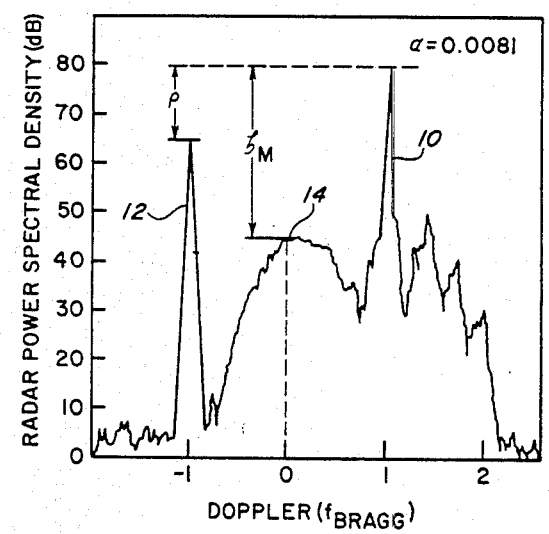
FIG. 2 is a radar Doppler spectrum for $\alpha = 0.0081$.
Figure 3:
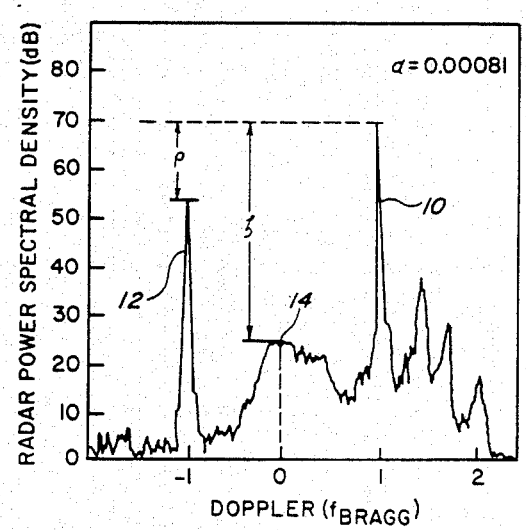
FIG. 3 is a radar Doppler spectrum for $\alpha = 0.00081$.

FIGS. 2 and 3 illustrate two radar Doppler spectra showing the effect of changing the constant $\alpha$ of Equation (4) by a factor of ten, due to the sea surface being 10 db down from traditional saturation values in the high frequency regime. Thus, in FIG. 2, $\alpha = 0.0081$; whereas, in FIG. 3, $\alpha = 0.00081$. The spectra in FIGS. 2 and 3 have essentially the same shape; however, the first-order Bragg lines 10 and 12 of FIG. 3 are each down by 10 db relative to the Bragg lines 10 and 12 of FIG. 2, while the second-order zero Doppler continuum 14 of FIG. 3 is down by 20 db relative to FIG. 2. These changes are as predicted by Equations (3) and (7) for once- and twice-scattered radar waves with each scatter being proportional to a resonant ocean wave component. It should be noted that the ratio $\rho$ between the amplitude of the approach Bragg line 10 and the recede Bragg line 12 remains the same for the spectra of FIGS. 2 and 3. The amplitude ratio $\zeta_M$ of the maximum Bragg line (10 in FIGS. 2 and 3) to the zero Doppler continuum 14, however, differs between the spectra of FIGS. 2 and 3 by a factor of 10 db.

The ratio $\rho$ may be defined as:

$$\rho = 10 \log [F(\theta)/F(\theta+\pi)] \quad (8)$$

where $F(\theta)$, the spreading function, is given by:

$$F(\theta) = \begin{cases} a + \cos^2\theta, & 0 \leq \theta \leq 90^\circ \\ a^2/(a + \cos^2\theta), & 90^\circ \leq \theta \leq 180^\circ \end{cases} \quad (9)$$

where $a = 0.0673$, an empirically determined constant. Substituting Equation (9) into Equation (8), we obtain:

$$\rho = 10 \log [1 + a^{-1} \cos^2 \theta]^2 \quad (10)$$

Inverting Equation (10) we obtain:

$$\theta = \cos^{-1} \{a(10^{\rho/20} - 1)\}^{\frac{1}{2}} \quad (11)$$

Equation (11) thus defines the angle $\theta$ between the radar bearing and the wind/wave directions. Therefore, the angle $\theta$ can be determined from Equation (10) by measuring the ratio $\rho$ from a Doppler spectrum.

The relationship between the ratio $\zeta_M$ and the constant $\alpha$ requires a knowledge of which components are being sensed by the radar at zero Doppler. The present Inventor has determined that the ocean wave frequency sensed by the second-order Doppler energy at zero Doppler frequency is very nearly the same as the wave frequency sensed by the first-order Bragg scatter, and is generally far from the peak of the spectrum, but almost certainly in the region where the wave frequency spectrum behaves as $K^{-3}$. (The region of the asymtotes in FIG. 1).

Since the Bragg ocean wave frequency, $K_B$, and the wave frequency contributing to the zero Doppler amplitude, $K_o$, are nearly equal, both are unaffected by the exponential of Equation (5) and will scale in a similar manner with changing $\alpha$. That is, as long as the peak of the wave spectrum is much less than the Bragg ocean wave frequency, slight changes in the position of the peak due to different wind speeds will have no effect on the wave spectrum amplitude at $K_B$ and $K_o$. The amplitude at these frequencies will be determined only by the parameter, $\alpha$, (which is a function of fetch) and wind/radar angle so long as the wind is sufficiently strong to drive the peak of the spectrum far from the Bragg frequency, so that the exponential term of Equation (5) is nearly one.

Using the corner reflector model for the sea surface described by Trizna et al. (referenced hereinabove) curves have been generated for the saturated value of $\zeta(\zeta_{SAT})$, the ratio between the amplitude of the strongest Bragg line in the Doppler spectrum and the zero-Doppler continuum amplitude, as a function of $\theta$, the angle between the radar bearing and the wind/curve direction, for various values of the parameter $\alpha$. These curves are presented in FIG. 4.

Figure 4:
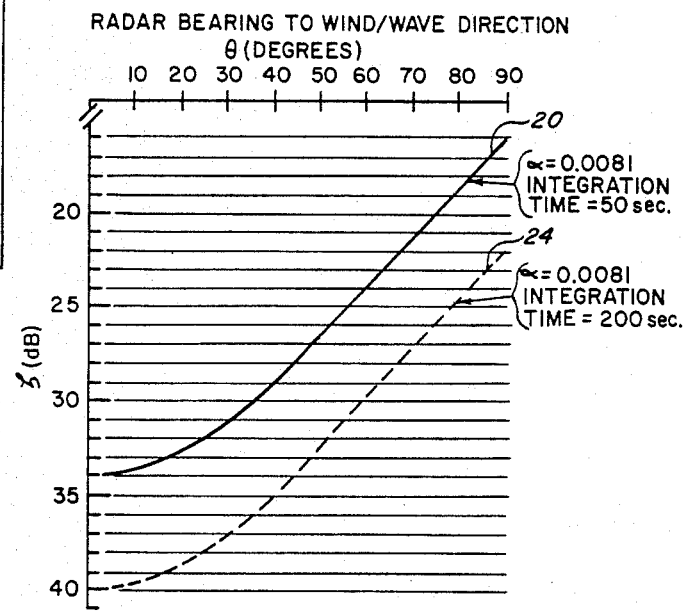
FIG. 4 is a plot of the maximum Bragg spectral line to continuum saturation ratio $\zeta_{SAT}$ as a function of radar bearing to wind/wave direction $\theta$ for two values of the constant $\alpha$.

In FIG. 4, the solid curve 20 is the locus of saturated $\zeta_{SAT}$ for a value of the constant $\alpha$ equal to 0.0081, and a coherent integration time of 50 seconds. If the omnidirectional sea spectrum is down 6 db from the satured condition, then the first order Bragg line amplitudes will also be down 6 db each from their "saturated" values. The ratio of the Bragg lines, $\rho$, will not be different, however, since $\rho$ depends only upon the directional spreading of the ocean waves. Since the zero Doppler amplitude is of second order in the ocean wave spectrum, it will be down 12 db from its value for the "saturated" sea. The ratio $\zeta$ will decrease by the difference in the db change of the first order Bragg line and the second order Doppler continuum, i.e., 6 db. A second curve 24 (dashed line) is shown in FIG. 4 which differs by 6 db from the first curve 20 with the same variation with angle $\theta$. The second curve 24 was derived for $\alpha$ equal to 0.0081, but for an integration time four times greater than that of the first curve 20, or 200 seconds. The second curve 24 can also be considered as being derived for $\alpha = 0.0020$ for the same integration time (50 seconds) as that of the first curve 20. This is due to the fact that the Bragg lines are coherent signals, while the continuum is broad band and therefore behaves as noise. These values sum like $\tau$ and $\sqrt{\tau}$, respectively, where $\tau$ is the coherent integration time.

Figure 5:
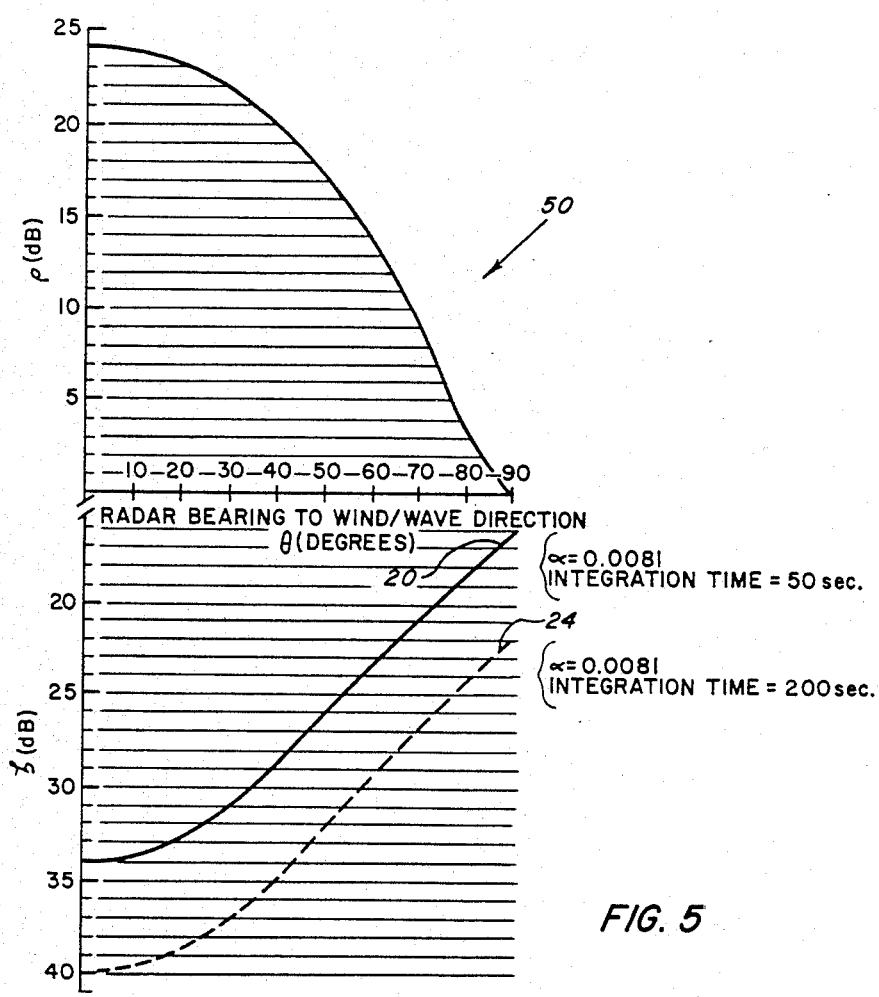
FIG. 5 is a nomograph used to determine the amplitude difference between the saturated ratio $\zeta_{SAT}$ to the measured ratio $\zeta_M$ according to the present Invention.

FIG. 5 is a nomograph 50 which the present Inventor has developed as an aid in estimating the radar cross-section of the sea surface $\sigma^\circ$. The upper portion of the nomograph 50 is a plot of $\rho$ as a function of the radar bearing to wind/wave direction angle $\theta$, as given by Equation (10). The lower portion of the nomograph 50 is a plot of the saturated $\zeta$ as a function of the angle $\theta$, and is therefore identical to the curves given in FIG. 4.

To use the nomograph 50, the ratios $\rho$ and $\zeta_M$ are measured from a Doppler spectrum. The measured value of $\rho$ is located on the upper vertical axis of the nomograph and a horizontal line is drawn until it intersects the curve for $\rho$. The angle $\theta$ is determined by dropping a perpendicular line from the point of intersection with the curve to the horizontal axis. Alternatively, the angle $\theta$ may be determined by substituting the measured value of $\rho$ into Equation (11). The perpendicular line is then continued into the lower portion of the nomograph 50. The measured value $\zeta_M$ is then located on the lower vertical axis and a horizontal line is drawn until it intersects with the perpendicular line. The number of db at this point of intersection lies below the saturated value $\zeta_{SAT}$ is $\Delta_m$, the number of db down the scattering cross-section of the sea is from its saturation value for the angle $\theta$. This value must yet be corrected for the integration period used in processing the radar Doppler spectrum used to measure $\rho$ and $\zeta_M$. The corrected value of $\Delta_M$ is designed by $\theta$. It should be noted that once the angle $\theta$ is known, either from FIG. 4 or from equation 11, the value $\Delta_M$ may be determined from either FIG. 4 or FIG. 5.

The correction to be added to $\Delta_M$ is equal to the ten times the log of the ratio of the actual integration time used to the integration time for the curve for saturated $\zeta$ used, or:

$$\Delta = \Delta_M + 10 \log [\tau/\tau_{SAT}] \tag{12}$$

where $\tau$ is the actual integration time used and $\tau_{SAT}$ is the integration time for the curve for saturated $\zeta$ used. Since the curve 20 for saturated $\zeta$ of the nomograph 50 and for FIG. 4 was generated for a 50 second integration time, if the actual integration time used is twice the value, 3 db should be added to $\Delta_M$, while 6 db should be added if the actual integration time is four times this value, and so on. Alternatively, curves for other integration times can be generated, as has been done for an integration time of 200 seconds (curve 24). The measured value of $\zeta_M$ would then be compared to the curve appropriate for the integration time actually used to determine $\Delta_M$.

In the case of ionospherically propagated signals, particularly via F-layer modes, an integration time should be chosen such that the Bragg lines just fill the Doppler filter, or sum up the energy in all the Doppler filters which have contributions from the Bragg lines for longer integration times. The simplest course is to use 50 second integration times, which have been found to be optimum for very good ionospheric conditions, and to use the 50 second curve 20 in the nomograph 50 for $\alpha = 0.0081$. If the ionospheric conditions are relatively poor with a 50 second value such that the Bragg lines contribute to several adjacent Doppler filters, then all of the energy in the Bragg lines, possible encompassing several Doppler filters, must be summed prior to measuring $\zeta$. This will not be a factor in measuring $\rho$ since both Bragg lines are affected the same way.

The value of the radar cross-section of the sea surface $\sigma^\circ$ may now be estimated using the value of $\Delta$ determined as decribed above. The cross-section is given by:

$$\sigma^\circ(\theta) = \sigma^\circ(0) + \Delta + G(\theta) \tag{13}$$

where $\sigma^\circ(0)$ is a constant equal to $-26.9$ db.

The factor $G(\theta)$ is given by:

$$G(\theta) = 10\text{LOG}[F(\theta) + F(\theta + \pi)] \quad (14)$$

$$= -12db + (\rho/2) + 10\text{LOG}[1 + 10^{-\rho/10}]$$

Combining Equations (13) and (14) we obtain:

$$\sigma^\circ(\theta) = -38.9 \, db + \Delta + (\rho/2) + 10 \log [1 + 10^{-\rho/10}] \quad (15)$$

Once the radar cross-section of the sea surface $\sigma^\circ$ is determined from Equation (15), the cross-section of any targets appearing in the Doppler spectrum may be determined by simply scaling their amplitudes against the highest amplitude Bragg spectral line.

An example will now be presented wherein the method of the present invention is used to estimate the cross-section $\sigma^\circ$ for a case of skywave propagation in which a target (most probably a ship) is seen. The cross-section of the target will then be estimated.

Figure 6:
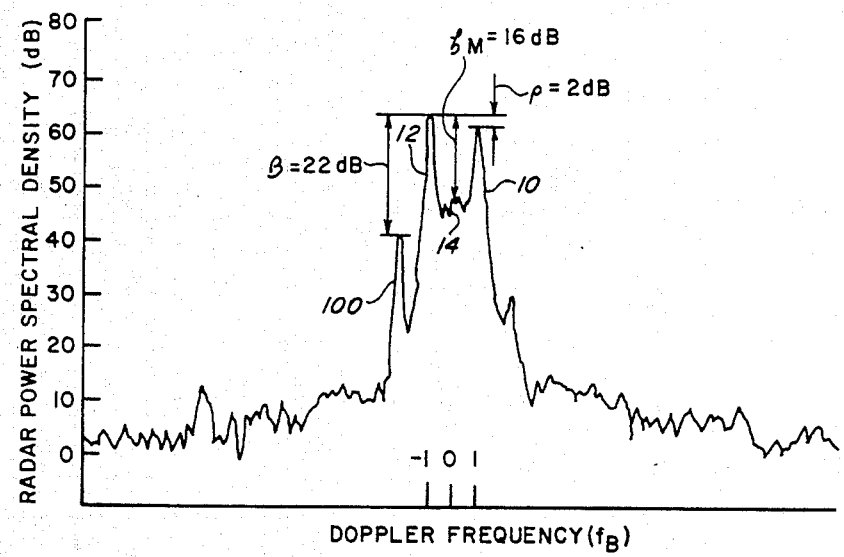
FIG. 6 illustrates a Doppler spectrum for a practical example used to illustrate the method of the present Invention.

FIG. 6 illustrates a typical radar Doppler spectrum collected with a 17 second integration time and a 21.8 MHz radar frequency. The spectrum includes an approach Bragg line 10, a recede Bragg line 12, and the zero Doppler continuum 14. Additionally, an unknown target 100 appears in the spectrum. The ratio $\rho$ between the Bragg lines 10 and 12 is measured to equal 2 db. Similarly, the ratio $\zeta_m$ between the highest Bragg line 12 and the zero Doppler continuum 14 is measured to equal 16 db.

Figure 7:
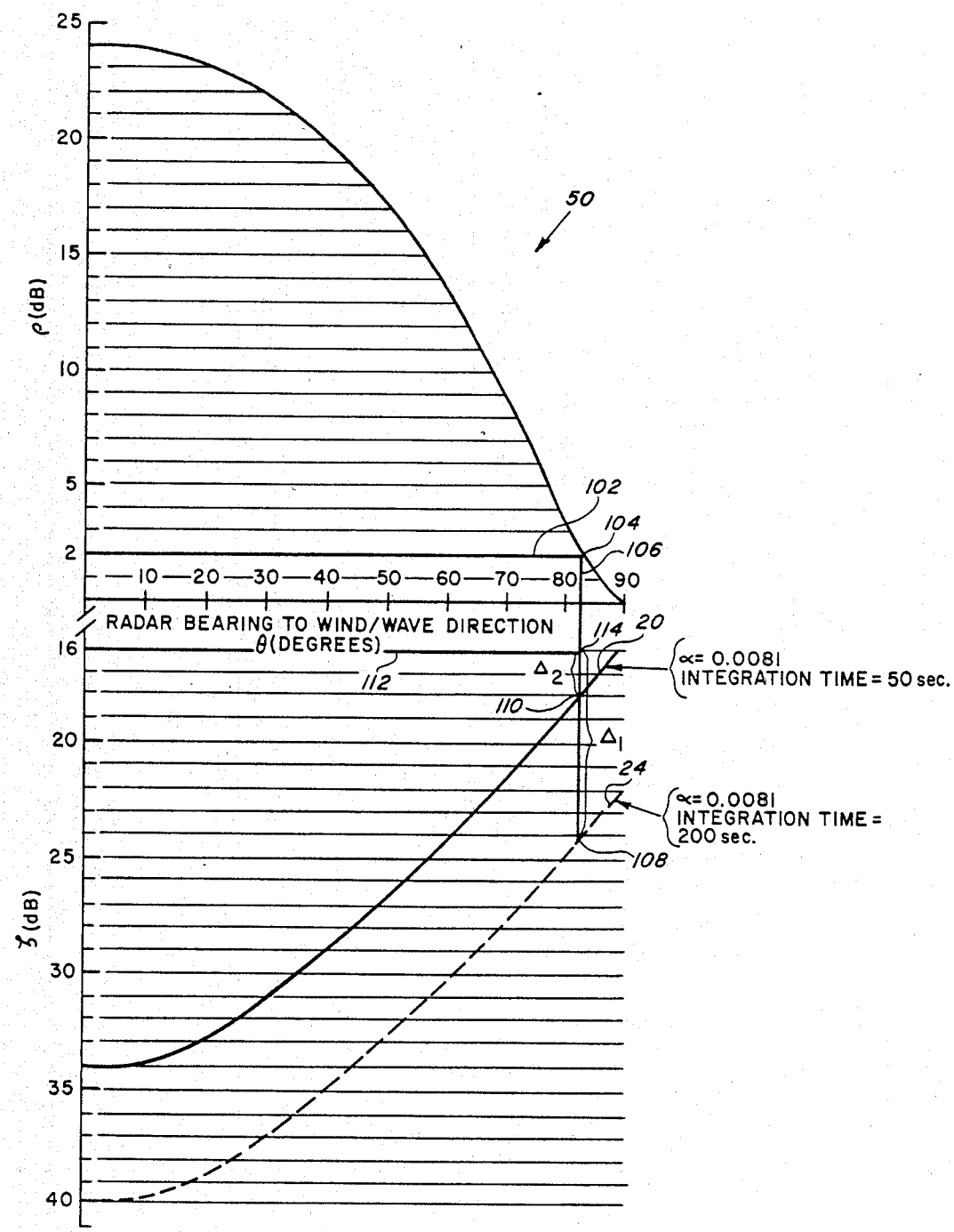
FIG. 7 is a nomograph similar to that of FIG. 5 illustrating the method of the present invention for the Doppler spectrum shown in FIG. 6.

FIG. 7 is a nomograph 50 identical to that shown in FIG. 5. In FIG. 7, a value of $\rho$ equal to 2 db has been located along the upper vertical axis and a horizontal line 102 has been drawn to intersect the curve for $\rho$ at point 104. From point 104, a vertical line 106 has been drawn to intersect the curve 24 at point 108. The vertical line 106 additionally crosses the curve 20 at point 110. Either curve 20 or curve 24 may be used in the present analysis as will be described below. The vertical line 106 crosses the horizontal axis at approximately 83° which determines the radar to wind/wave angle $\theta$. It should be noted that the angle $\theta$ could also be determined using Equation (11) and the following could be determined from either the curves of FIG. 4 or the nomograph 50 of FIG. 5 or 7.

Returning to FIG. 7, the measured value $\zeta_M$ is located along the lower vertical axis and a horizontal line 112 is drawn which intersects the vertical line 106 at point 114. The difference between points 108 and 114 is a factor $\Delta_1 = 8$ db which must be corrected for the integration time used by means of equation (12) as follows:

$$\Delta = \Delta_1 + 10 \log (17/200)$$

$$\Delta = 8 + (-10.7) = -2.7 \, db$$

Alternatively, the curve 20 may be used. Here the difference between points 110 and 114 is a factor $\Delta_2 = 2$ db. This is corrected for integration time as follows:

$$\Delta = \Delta_2 + 10 \log (17/50)$$

$$\Delta = 2 + (-4.7 \, db) = -2.7$$

The cross-section $\sigma^\circ$ may now be estimated using Equation (15) as follows:

$$\sigma^\circ(\theta) = -38.9 + (-2.7) + (2/2) + 10 \log [1 + 10^{-0.2}]$$

$$\sigma^\circ(\theta) = -38.5 \, dbm^2/m^2$$

The scattering cell for the pulse length and the beam width used to collect the Doppler spectrum of FIG. 6 was of the order of $10^9$ meters squared or 90 db above a square meter. Thus the sea surface scattering cross-section $\sigma$SEA is 90 db $+ \sigma^\circ(\theta)$ or 51.5 db m$^2$.

The value of the cross-section of the target $\sigma$ may now be estimated. From FIG. 6, the amplitude difference $\beta$ between the maximum Bragg line 12 and the target 100 is measured to be 22 db. The target cross-section is obtained by subtracting this amplitude difference from the sea surface scattering cross-section $\sigma_{SEA}$:

$$\sigma_T = \sigma_{SEA} - \beta$$

$$\sigma_T = 29.5 \, dbm^2$$

or in actual area:

$$\sigma_T = 891 \, m^2$$

Care must be taken in employing the method of the present invention to estimate cross-sections of targets. The largest value of the target signal should be selected from a series of Doppler spectra because polarization fading on targets is far more severe for a small target than for the Doppler spectrum of the sea surface. Ideally the Doppler sea echo spectrum should be averaged for a minimum of 10 minutes and the largest target cross-section observed in that time period should be selected for use in cross-section estimations.

The present invention provides a method which allows the cross-section of the sea surface at HF to be estimated by a very simple measurement of two characteristics of the radar Doppler spectrum: the approach-recede Bragg line ratio $\sigma$, and the spectral energy ratio of the strongest Bragg line to the average continuum amplitude near zero Doppler frequency $\zeta_M$. Using these measurements, the scattering cross-section per unit area $\sigma^\circ$ can be estimated for the observed patch of sea surface being illuminated. The method of the present invention does not require any system calibration or knowledge of antenna gain patterns, ionospheric D-region losses, and the like, and thus is self-calibrating. The method has been applied to radar data collected in the surface wave mode and the results were compared to independent measurements of the omnidirectional sea spectrum mode by a waverider Buoy. The data agreed quite well with one another for the several look angles and ranges that were used for the measurements at frequencies above approximately 4 MHz. The data showed a tendency to disagree with the buoy spectra for the lowest radar frequencies in the range of 2 to 4 MHz. This is believed to be due to inaccuracies in the model used to develop the curves for $\zeta_{SAT}$ shown in FIGS. 4 and 5 for frequencies below 4 MHz.

Further information regarding the present invention may be obtained from "Estimation of the Sea Surface Radar Cross Section at HF from Second-Order Doppler Spectrum Characteristics" by D. B. Trizna, NRL Report 8579, May 25, 1982, Naval Research Laboratory, Washington, D.C., available from the National Technical Information Service (NTIS), Springfield, Va. The contents of this document are specifically incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for estimating the high frequency radar sea surface cross-section comprising the steps of:

scattering high frequency Doppler radar signals onto a sea surface and receiving echo returns in response therto;

correlating said echo returns over an integration time period to obtain a Doppler spectrum of said sea surface;

identifying an approach Bragg spectral line, a recede Bragg spectral line, and a zero Doppler frequency continuum level in said Doppler spectrum;

measuring the amplitude difference between said approach and recede Bragg spectral lines in said Doppler spectrum to determine an approach-/recede amplitude ratio $\rho$;

comparing said approach and recede Bragg spectral lines in said Doppler spectrum to determine the Bragg spectral line having the maximum amplitude;

measuring the amplitude difference between the maximum amplitude Bragg spectral line and said zero Doppler frequency continuum level in said Doppler spectrum to determine a measured Bragg line/continuum amplitude ration $\zeta_M$; and estimating the sea surface radar cross-section $\sigma^\circ(\theta)$ from said measured approach/recede ratio $\sigma$ and said measured Bragg line/continuum ratio $\zeta_M$ by:

determining an angle $\theta$ between the radar bearing used and the sea surface wind/wave direction using said approach/recede ratio $\rho$;

determining a Bragg line/continuum saturated ratio $\zeta_{SAT}$ from said angle $\theta$;

determining a difference value $\Delta_M$ between said saturated ratio $\zeta_{SAT}$ and said measured ratio $\zeta_M$;

correcting said difference value $\Delta_M$ for the integration time period used to obtain said Doppler spectrum to obtain a corrected difference value $\Delta$; and estimating the sea surface radar cross-section $\sigma^\circ(\theta)$ from said corrected difference value $\Delta$ and said approach/recede ratio $\rho$.

2. The method as recited in claim 1, wherein said step of determining said angle $\theta$ comprises the step of:

calculating said angle $\theta$ from the equation:

$$\theta = \cos^{-1} \{a(10^{\rho/20} - 1)\}^{\frac{1}{2}}$$

where: $a = 0.0673$.

3. The method as recited in claim 1, wherein said step of correcting said difference value $\Delta_M$ comprises the step of:

calculating said corrected difference value $\Delta$ from the equation:

$$\Delta = \Delta_M + 10 \text{ LOG } [\tau/\tau_{SAT}]$$

where:

$\tau$ is the integration time period used to obtain said Doppler spectrum; and $\tau_{SAT}$ is the integration time period associated with said Bragg line/continuum saturation ratio $\zeta_{SAT}$.

4. The method as recited in claim 1, wherein said step of estimating the sea surface radar cross-section $\sigma^\circ(\theta)$ comprises the step of:

estimating said sea surface radar cross-section $\sigma^\circ(\theta)$ from the equation:

$$\sigma^\circ(\theta) = -38.9 \text{ db} + \Delta + (\rho/2) + 10 \text{ LOG } [1 + 10^{-\rho/10}].$$

5. A method for estimating the high frequency radar sea surface cross-section comprising the steps of:

scattering high frequency Doppler radar signals onto a sea surface and receiving echo returns in response thereto;

correlating said echo returns over an integration time period to obtain a Doppler spectrum of said sea surface;

identifying an approach Bragg spectral line, a recede Bragg spectral line, and a zero Doppler frequency continuum level in said Doppler spectrum;

measuring the amplitude difference between said approach and recede Bragg spectral lines in said Doppler spectrum to determine an approach-/recede amplitude ratio $\rho$;

comparing said approach and recede Bragg spectral lines in said Doppler spectrum to determine the Bragg spectral line having the maximum amplitude;

measuring the amplitude difference between the maximum amplitude Bragg spectral line and said zero Doppler frequency continuum level in said Doppler spectrum to determine a measured Bragg line/continuum amplitude ratio $\zeta_M$;

determining an angle $\theta$ between the radar bearing used and the sea surface wind/wave direction using said approach/recede ratio $\rho$;

determining a Bragg line/continuum saturated ratio $\zeta_{SAT}$ from said angle $\theta$;

determining a difference value $\Delta_M$ between said saturated ratio $\zeta_{SAT}$ and said measured ratio $\zeta_M$;

correcting said difference value $\Delta_M$ for the integration time period used to obtain said Doppler spectrum to obtain a corrected difference value $\Delta$; and estimating the sea surface radar cross-section $\sigma^\circ(\theta)$ from said corrected difference value $\Delta$ and said approach/recede ratio $\rho$.

6. The method as recited in claim 5, wherein said step of determining said angle $\theta$ comprises the step of:

calculating said angle $\theta$ from the equation:

$$\theta = \cos^{-1} \{a(10^{\rho/20} - 1)\}^{\frac{1}{2}}$$

where: $a = 0.0673$.

7. The method as recited in claim 5, wherein said step of correcting said difference value $\Delta_M$ comprises the step of:

calculating said corrected difference value $\Delta$ from the equation:

$$\Delta = \Delta_M + 10 \text{ LOG } [\tau/\tau_{SAT}]$$

where:

$\tau$ is the integration time period used to obtain said Doppler spectrum; and $\tau_{SAT}$ is the integration time period associated with said Bragg line/continuum saturation ratio $\zeta_{SAT}$.

8. The method as recited in claim 5, wherein said step of estimating the sea surface radar cross-section $\sigma^\circ(\theta)$ comprises the step of:

estimating said sea surface radar cross-section $\sigma^\circ(\theta)$ from the equation:

$$\sigma°(\theta) = -38.9 \text{ db} + \Delta + (\rho/2) + 10 \text{ LOG}[1+10^{-\rho/10}].$$

9. A method for estimating the high frequency radar cross-section of a target comprising the steps of:
   scattering high frequency Doppler radar signals onto a sea surface including a target and receiving echo returns in response thereto;
   correlating said echo returns over an integration time period to obtain a Doppler spectrum of said echo returns;
   identifying a target spectral line, an approach Bragg spectral line, a recede spectral line, and a zero Doppler frequency continuum level in said Doppler spectrum;
   estimating the radar cross-section $\sigma°(\theta)$ of said sea surface; and
   determining the radar cross-section of said target $\sigma_T$ from said radar sea surface cross-section $\sigma°(\theta)$ wherein said of estimating the radar cross section $\sigma°(\theta)$ of said sea surface comprises the steps of:
   measuring the amplitude difference between said approach and recede Bragg spectral lines in said Doppler spectrum to determine an approach-/recede amplitude ratio $\rho$;
   comparing said approach and recede Bragg spectral lines in said Doppler spectrum to determine the Bragg spectral line having the maximum amplitude;
   measuring the amplitude difference between the maximum amplitude Bragg spectral line and said zero Doppler frequency continuum level in said Doppler spectrum to determine a
   measured Bragg line/continuum amplitude ratio $\zeta_m$;
   determining an angle $\theta$ between the radar bearing used and the sea surface wind/wave direction using said approach/recede ratio $\rho$;
   determining a Bragg line/continuum saturated ratio $\zeta_{SAT}$ from said angle $\theta$;
   determining a difference value $\Delta_M$ between said saturated ratio $\zeta_{SAT}$ and said measured ratio $\zeta_M$;
   correcting said difference value $\Delta_M$ for the integration time period used to obtain said Doppler spectrum to obtain a corrected difference value $\Delta$; and
   estimating the sea surface radar cross-section $\sigma°(\theta)$ from said corrected difference value $\Delta$ and said approach/recede ratio $\rho$.

10. The method as recited in claim 9, wherein said step of determining said angle $\theta$ comprises the step of:
    calculating said angle $\theta$ from the equation:

$$\theta = \cos^{-1}\{a(10^{\rho/20}-1)\}^{\frac{1}{2}}$$

where: $a = 0.0673$.

11. The method as recited in claim 9, wherein said step of correcting said difference value $\Delta_M$ comprises the step of:
    calculating said corrected difference value $\Delta$ from the equation:

$$\Delta = \Delta_M + 10 \text{ LOG }[\tau/\tau_{SAT}]$$

where:
$\tau$ is the integration time period used to obtain said Doppler spectrum; and
$\tau_{SAT}$ is the integration time period associated with said Bragg line/continuum saturation ratio $\zeta_{SAT}$.

12. The method as recited in claim 9, wherein said step of estimating the sea surface radar cross-section $\sigma°(\theta)$ comprises the step of:
    estimating said sea surface radar cross-section $\sigma°(\theta)$ from the equation:

$$\sigma°(\theta) = -38.9 \text{ db} + \Delta + (\rho/2) + 10 \text{ LOG}[1+10^{-\rho/10}].$$

13. A method for estimating the high frequency radar cross-section of a target comprising the steps of:
    scattering high frequency Doppler radar signals onto a sea surface including a target and receiving echo returns in response thereto;
    correlating said echo returns over an integration time period to obtain a Doppler spectrum of said echo returns;
    identifying a target spectral line, an approach Bragg spectral line, a recede spectral line, and a zero Doppler frequency continuum level in said Doppler spectrum;
    estimating the radar cross-section $\sigma°(\theta)$ of said sea surface; and
    determining the radar cross-section of said target $\sigma_T$ from said radar sea surface cross-section $\sigma°(\theta)$ by:
    determining the area of the scattering cell illuminated by said scattered Doppler radar signals from the pulse length and beam width of said Doppler radar signals;
    adding said radar sea surface cross-section $\sigma°(\theta)$ to said area of said scattering cell to determine the sea surface scattering cross-section $\sigma_{SEA}$;
    comparing said approach and recede Bragg spectral lines in said Doppler spectrum to determine the Bragg spectral line having the maximum amplitude;
    measuring the amplitude difference $\beta$ between the maximum amplitude Bragg spectral line and the amplitude of said target spectral line; and
    substracting the amplitude difference $\beta$ from said sea surface scattering cross-section $\sigma_{SEA}$ to determine the radar cross-section $\sigma_T$ of said target.

* * * * *